April 24, 1962 F. R. PASCHKE ET AL 3,031,599
ALTERNATE DISCHARGE MULTIPLE FLASH LAMP CIRCUIT AND CONTROL
Filed Dec. 21, 1959
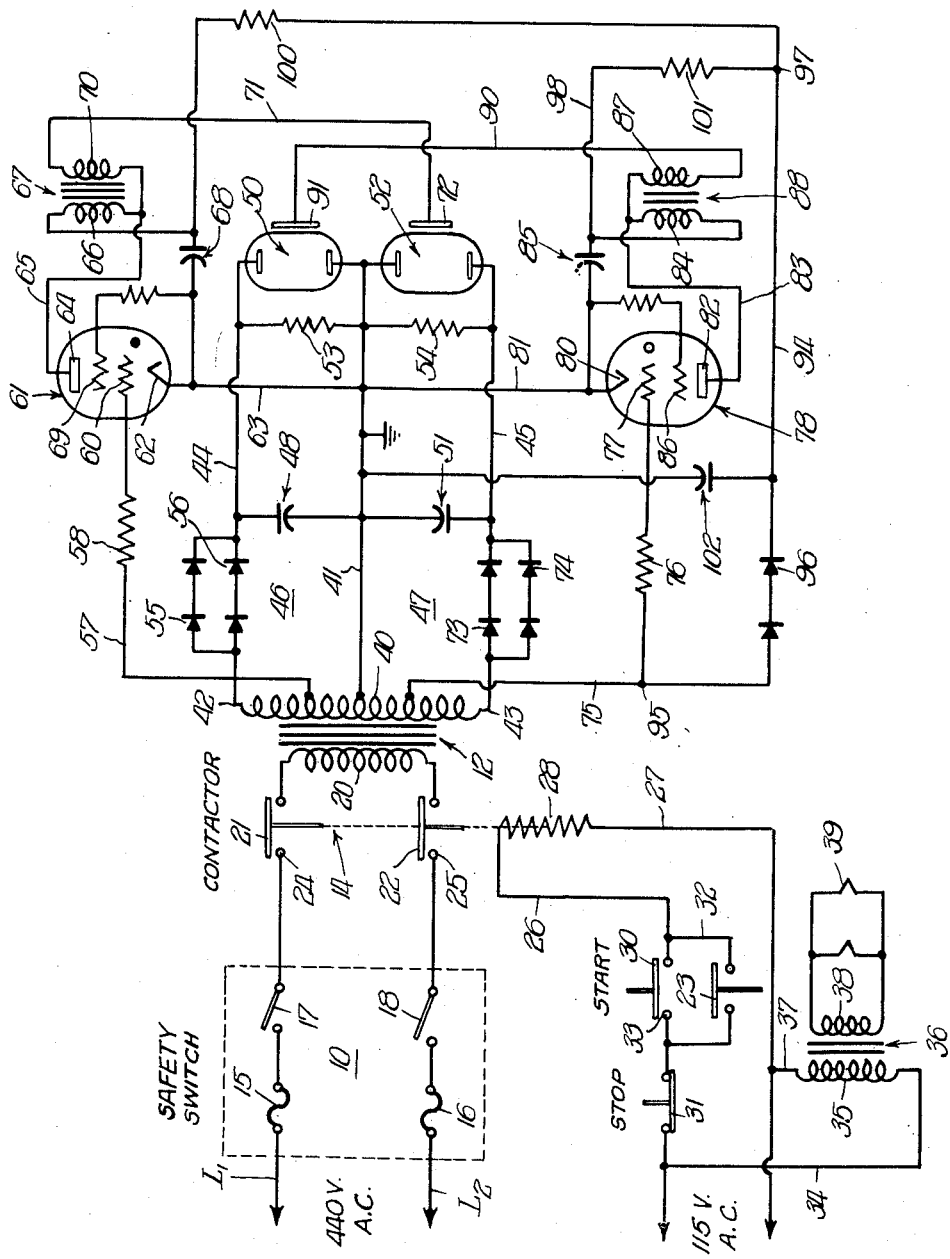
INVENTORS.
*Frank R. Paschke,*
BY *Alfred A. Wolf,*
*Byron Hume Groenr Clement*

United States Patent Office 3,031,599
Patented Apr. 24, 1962

3,031,599
ALTERNATE DISCHARGE MULTIPLE FLASH LAMP CIRCUIT AND CONTROL
Frank R. Paschke, Bellwood, Ill., and Alfred A. Wolf, Dallastown, Pa., assignors to Miehle-Goss-Dexter, Incorporated, Chicago, Ill., a corporation of Delaware
Filed Dec. 21, 1959, Ser. No. 860,982
7 Claims. (Cl. 315—201)

The invention relates to electric energy-producing systems of the flashing type, and has reference in particular to an improved electric circuit for flashing a pair of lamps, and wherein the said circuit will incorporate control means for flashing the lamps alternately and which will protect against the possibility of both lamps flashing simultaneously.

Heretofore only one flash lamp has generally been coupled to a power circuit and the same has been intermittently flashed by employing a single capacitor bank connecting with a high voltage electric power supply. However, serious problems have been encountered with such flashing circuits, since when the lamp is flashed it consumes current at a high rate. Also, if means are not employed to limit the flow of current from the power supply, the lamp will not only discharge the capacitor bank, but will also accept current from the power supply. If the power supply is capable of supporting this current flow, the lamp does not extinguish but continues to conduct until it melts its electrode and destroys its envelope. Conventional practice is to limit current flow or its duration by employing resistance, inductances or electrical switching of one kind or another, all of which is bulky and expensive.

Accordingly, the invention has for its object to provide an improved control system for alternately discharging a pair of flash lamps which will be relatively simple as regards the circuitry employed, which will operate at a high efficiency and which will effectively handle a high voltage input from the power supply.

Another object of the invention is to provide an electrical circuit for alternately charging a pair of capacitors and for respectively discharging the same through a pair of lamps to produce a high energy output as regards the lamps, and wherein the switching from one lamp to the other is effected by synchronized voltage pulses applied to a suitable pulse forming trip circuit.

A still further object of the invention is to provide a flash lamp control circuit as described which will be capable of alternately flashing a pair of lamps at a maximum frequency for said pair which will be twice that of the frequency of the power source.

Another object of the invention is to provide circuit means for alternately flashing a pair of lamps in a manner which will protect against the possibility of both lamps flashing simultaneously and which will operate the two lamps from a single phase power source, although basically the system can be adapted to the operation of a plurality of lamps from a multiple power source.

A further object resides in the provision of circuit means powered by an alternating current for flashing a pair of gaseous conductor type lamps, and wherein the capacitors for the lamps are alternately charged during respective half cycles of current, with the lamps being alternately discharged, so that for each half cycle one capacitor is charged whereas the other capacitor is discharged.

Another object in respect to the lamps as utilized in the present invention resides in the fact that the amount of energy expended per lamp is reduced in proportion to the number of lamps used and which thus materially increases the operating life of said lamps.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a schematic wiring diagram showing a preferred form of circuitry incorporating the improved means of the invention for alternately flashing a pair of lamps.

Referring to the drawings, the numeral 10 indicates a safety switch for the main transformer 12 and which transformer is adapted to be connected by the contactor 14 to a source of alternating current on the order of 440 volts, 60 cycles. The conductors $L_1$ and $L_2$ connect with the source of alternating current and within the housing of the safety switch there is provided a fuse such as 15 and 16 for each of the conductors, and a hand operated switch blade such as 17 and 18. When the switch blades 17 and 18 are closed the primary winding 20 of the transformer 12 is connected across the conductors $L_1$ and $L_2$ by the contactor 14 which actuates three contactor elements 21, 22 and 23. The contactor element 21 has coacting relation with the contacts 24 located in conductor $L_1$, whereas contactor element 22 has coacting relation with the contacts 25 located in the conductor $L_2$. The transformer 12 is preferably provided with a hypersil core whereby it is characterized by high permeability and with a relatively narrow hysteresis loop. The rating of the transformer primary may range to 440 volts with an ampere rating of approximately 50 and wherein the secondary winding would deliver approximately 2000 volts maximum.

The circuit for controlling actuation of the contactor 14 includes the conductors 26 and 27 which connect the coil 28 of the contactor across an alternating power source providing alternating current of approximately 115 volts, 60 cycle frequency. A manually operated start button 30 is interposed in the conductor 26 and in a similar manner there is also imposed in said conductor a manually operated stop button 31. The parallel circuit 32, connected across the contacts 33 for the start button 30, includes the contactor elements 23 and, accordingly, when the contactor is actuated into an operative position by energization of the coil 28, the primary winding 20 of the transformer 12 is connected across its source of alternating current. The closing of the contactor elements 21 and 22 also effects a closing of the contactor element 23, and although the start button 30 may be released, nevertheless the coil 28 will be maintained energized until the circuit is broken through conductor 26 by actuation of the stop button 31.

A filament circuit is provided for the electronic valves to be presently described, the said circuit being connected to the conductors 26 and 27 and thus deriving its power from the 115 volt power source. Conductor 34 connects one end of the primary winding 35 of transformer 36 with conductors 26, whereas conductor 37 directly connects the other end of the primary winding to conductor 27. The secondary winding 38 supplies a current of approximately six volts for energizing the filaments 39 of the electronic valves comprising elements in the control circuit for alternately flashing a pair of lamps, which will now be described in detail.

The main power transformer 12 includes a secondary winding 40 which is center tapped by the conductor 41. At respective ends of the winding, namely, 42 and 43 additional conductors connect with the winding such as 44 and 45, respectively. Accordingly, the center tap 41 and conductor 44 form one condenser-lamp circuit, the same being designated by numeral 46 and the center tap 41 and conductor 45 form another condenser-lamp circuit which is designated by numeral 47. The condenser 48 and the lamp 50 are directly connected to the conductors 41 and 44, and thus these two elements are connected in parallel across the upper half of the secondary winding 40. In a similar manner the condenser 51 and the lamp 52 are directly connected to conductors 41 and 45, and the two elements are connected in parallel across the lower half of the secondary winding 40. Also, each of the condenser-lamp circuits include a resistance such as 53 and 54, respectively, which is connected in parallel with the condenser and with the lamp of its particular circuit. The condensers 48 and 51 will vary in capacity depending on the amount of energy desired in the flash and for the embodiment of the invention as herein disclosed, the said capacitors may range from 10 to 50 microfarads with a voltage rating of approximately 3,000 volts. The lamps 50 and 52 will include a closed tube or envelope made of fused quartz or the like, and said envelope will contain an inert gas such as krypton or xenon under pressure. There may be added to the envelope a small amount of mercury for increasing intensity of the lamp. The resistances 53 and 54 will each have a rating of approximately 20 thousand ohms. The said resistances will function to facilitate the discharging of the condensers 48 and 51 on shut down and they additionally provide a high-resistance low-current path for current flow when the condensers are fully charged. Also the resistances permit discharge of the condensers in the event the lamps 50 and 52 fail to flash.

For the positive half cycle of the alternating current power source, it will be assumed that current will flow in the secondary winding 40 from the end 43 to 42, and thus for this positive half cycle the condenser 48 will be charged. To properly direct this flow of current and to prevent current flow in a reverse direction, the conductor 44 is provided with a plurality of silicon rectifiers 55 and with a plurality of selenium rectifiers 56. The winding 40 is tapped for a voltage of approximately 200 volts by the conductor 57 containing the resistance 58 and which connects with the control grid 60 of the gas tetrode 61. The cathode 62 is connected by conductor 63 to the center tap 41 and the plate 64 of the tetrode is joined by conductor 65 to the primary winding 66 of the pulsing transformer 67. The grid-cathode circuit also contains a condenser 68 which is located between the cathode and the primary winding of the transformer. The numeral 69 indicates a screen grid. The secondary winding 70 of the transformer 67 is connected by the conductor 71 to the terminal 72 which is in close physical relation with the envelope for triggering the lamp 52.

The negative half cycle of the power source will cause a current to flow in secondary winding 40 from 42 to 43 and during this negative half cycle the condenser 51 will be charged. Also, to control current flow in the condenser-lamp circuit 47, the conductor 45 is provided with the silicon rectifiers 73 and with the selenium rectifiers 74. The 200 volt tap provided by conductor 75 includes the resistor 76 and said conductor is connected to the control grid 77 of the gas tetrode 78. The cathode 80 of said tetrode is connected to the center tap 41 by the conductor 81 and the plate 82 is connected by conductor 83 to the primary winding 84 and to condenser 85, all forming the plate-cathode circuit of said tetrode. The secondary winding 87 of the pulsing transformer 88 is connected by conductor 90 to the triggering terminal 91 which is in close physical relation with the envelope of the lamp 50.

A charging circuit for the condensers 68 and 85 is provided by the conductor 94. The said conductor has connection at 95 with the tap conductor 75. The charging circuit including conductor 94 employs a plurality of rectifiers 96, and the said conductor is connected at 97 to conductor 98, having connection with condenser 85. Accordingly, both condensers 68 and 85 are coupled to the charging circuit in a similar manner and which includes a current limiting resistor such as 100 and 101. The condenser 102 connected between the center tap 41 and the conductor 94 acts as a filter and smooths out the rectified current delivered by the rectifiers 96.

The circuit of FIGURE 1 functions to alternately flash the lamps 50 and 52 by alternately charging and discharging the condensers 48 and 51. For operating the circuit it is first necessary to close the safety switch consisting of the switch blades 17 and 18, and then to press the start button 30 which actuates the contactor 14 to connect the primary winding 20 of the main transformer 12 with the alternating current power source. For the positive half cycles of the alternating current, it will be assumed that the current flows in winding 40 from 43 to 42. The condenser 48 will, accordingly, be charged to its maximum potential during approximately the first half of this positive half cycle. During the remaining portion of the half cycle, current will continue to flow through the resistance 53. Current flow in the resistance dissipates about ten percent of the electrical energy received from the power source. However, the resistance provides a flow path which facilitates the charging of the condenser 48 and the resistance will also function to discharge the condenser in the event the lamp 50 should fail to flash.

For the next half cycle of the alternating current, flow will take place in winding 40 from 42 to 43, and which will be the negative half cycle. The condenser 51 will be charged during the first half thereof to its maximum potential and thereafter the current flow taking place through resistance 54 will dissipate some of the electrical energy received from the power source. Simultaneously with charging of 51, it will be understood that the charging circuit for condensers 68 and 85 is also operative to effect a charging of these condensers. Current flow in the winding 40 is in a direction to be passed by the rectifiers 96 and by means of conductors 94 and 98, electrical energy is applied to one terminal of each of the condensers. The other terminal of each condenser is connected by the cathode conductor of its respective valve to the tap conductor 41, thus completing the charging circuit for the said condensers.

During this negative half cycle, the voltage applied by the tap conductor 75 to the control grid 77 of the electronic valve 78 will gradually increase and eventually the valve will be caused to fire to thus discharge the previously charged condenser 85 through the primary winding 84 of the pulsing transformer 88. Accordingly, a high voltage pulse is induced in the secondary winding 87 and the same is applied by conductor 90 to the triggering terminal 91 of the lamp 50. This high voltage pulse will ionize the gas within the lamp 50, causing the lamp to conduct and thus the condenser 48 discharges through the lamp transforming the stored energy into light, including the white, infra-red and the ultra-violet parts of the spectrum, with the continuity and intensity of the flash depending on the character of lamp employed and the voltage impressed across the terminals.

The next positive half cycle of the alternating current will flow in winding 40, from 43 to 42. Thus the condenser 48 will be charged again and eventually this positive half cycle will apply a voltage by conductor 57 to the control grid 60 of the electronic valve 61 sufficient to fire the valve. Firing of the valve discharges condenser 68 through the primary winding 66 of the pulsing transformer 67 and the high voltage pulse induced in secondary winding 70 is transmitted to the triggering terminal 72 of the lamp 52. Accordingly, for this positive half cycle the lamp 52 is rendered conductive to discharge condenser 51 through the same.

During operation of the circuit as described it will be seen that for the positive half cycles of the power source the lamp 52 is caused to flash, whereas for the negative half cycles, the lamp 50 is caused to flash. The frequency of the flashes as produced by the disclosed embodiment is, therefore, twice that of the frequency of the power source. It will also be understood that for each half cycle, whereas one lamp is being fired, the condenser for the other lamp is being charged. Thus the character of the electrical circuit as herein provided, including the rectifiers which control flow of current in the respective condenser-lamp circuits, produces a blocking of the said circuits all in a manner to prevent the simultaneous firing of both lamps.

It will also be understood that a suitable type of mechanical pulse producing means may be employed in the place of the electronic circuit for firing the lamps, or the said electronic circuit may be replaced with an electric circuit utilizing transistors.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. Apparatus of the character described having in combination, a source of alternating current, a capacitor, means connecting the capacitor with the source of alternating current so as to charge the capacitor during half cycles of one polarity of said current, a luminescent-discharge device having a triggering terminal, said luminescent-discharge device having an electrical connection with the capacitor whereby the capacitor may discharge through the device to cause the same to flash, a grid controlled electronic valve having a plate and a cathode, a condenser in the plate-cathode circuit of said valve and which is discharged upon firing of the valve, means producing a high voltage pulse upon discharge of the condenser and which is delivered by said means to the triggering terminal of the luminescent-discharge device, and said grid-controlled electronic valve having a connection with the source of alternating current whereby the valve is fired during the half cycles of the opposite polarity of said current.

2. Apparatus of the character described having, in combination, a source of alternating current, a capacitor connected in parallel relation with said alternating current source in a manner whereby the capacitor is charged during each half cycle of one polarity of said current, a luminescent-discharge device connected in parallel with the capacitor so that the capacitor may discharge through the device to cause the device to flash, said luminescent-discharge device having a normally unenergized control electrode operative when energized to cause the device to conduct and discharge the capacitor, a resistor in parallel relation with both the capacitor and device and located between the said elements, a normally non-conductive electronic valve having a control grid, circuit means including said electronic valve for producing a high voltage pulse when the valve is fired, means connecting the circuit means with the control electrode and which is energized when the high voltage pulse is delivered to the same for rendering the device conductive, and said electronic valve having a connection with the source of alternating current such that a voltage is applied to its control grid to fire the valve during each half cycle of opposite polarity of said current.

3. In a flashing circuit for a plurality of gaseous-conductor type lamps, the combination with a source of alternating current, of a first and a second condenser-lamp circuit each having a condenser and a gaseous conductor type lamp connected in parallel relation with each other so that the condenser may discharge through the lamp for flashing the same, each condenser-lamp circuit having such connection with the alternating current source that positive half cycles of current flow in one circuit for charging its condenser whereas negative half cycles of current flow in the other circuit for likewise charging its condenser, rectifiers in each condenser-lamp circuit for controlling the direction of current flow in the circuit, a trip circuit in electrical connection with each condenser-lamp circuit for producing a voltage pulse when the trip circuit is rendered operative, a triggering terminal in associated relation with each gaseous conductor type lamp for rendering the lamp conductive when energized, a first conductor connecting the trip circuit of the first condenser-lamp circuit with the triggering terminal of the lamp of the second condenser-lamp circuit, and a second conductor connecting the trip circuit of the second condenser-lamp circuit with the triggering terminal of the lamp of the first condenser-lamp circuit, whereby the lamps are rendered conductive when the triggering terminal thereof is energized by the voltage pulse delivered thereto by its respective trip circuit.

4. In a flashing circuit for a plurality of gaseous conductor type lamps, the combination with a source of alternating current, of a first and a second condenser-lamp circuit each having a condenser and a gaseous conductor type lamp connected in parallel relation with each other so that the condenser may discharge through the lamp for flashing the same, each condenser-lamp circuit having such connection with the alternating current source that positive half cycles of current flow in one circuit for charging its condenser whereas negative half cycles of current flow in the other circuit for likewise charging its condenser, rectifiers in each condenser-lamp circuit for controlling the direction of current flow in the circuit, a resistor in each circuit in parallel relation with both the condenser and lamp of its circuit, and a first and a second trip circuit for rendering its particular lamp conductive when the trip circuit thereof is made operative, said first trip circuit being rendered operative when positive half cycles of current flow in the first condenser-lamp circuit for effecting conductivity of the lamp of the second condenser-lamp circuit, and said second trip circuit being rendered operative when negative half cycles of current flow in the second condenser-lamp circuit for effecting conductivity of the lamp of the first condenser-lamp circuit.

5. In a flashing circuit for a plurality of gaseous conductor type lamps, in combination, a tap conductor, a first and a second conductor, a first and second rectifier, a pair of condensers and a pair of gaseous conductor type lamps, one of said condensers and one of said lamps being connected in parallel by the tap conductor and the first conductor through the first rectifier, the other condenser and the other lamp being connected in parallel by the tap conductor and the second conductor through the second rectifier, and a source of alternating current for charging one condenser during the positive half cycles of current flow and for charging the other condenser during the negative half cycles of current flow, a trip circuit for each lamp for rendering the lamp conductive when the trip circuit is rendered operative, and means for rendering one trip circuit operative during charging of the one condenser for effecting conductivity of the lamp associated with the other condenser, and other means for rendering the second trip circuit operative during charging of the other condenser for effecting conductivity of the lamp associated with the said one condenser.

6. In a flashing circuit for a plurality of gaseous conductor type lamps, in combination, a power transformer providing a secondary winding as a source of alternating current, a center tap conductor connected to said winding, a first and a second conductor connected to the respective ends of the winding, a first condenser and a first lamp connected in parallel by the tap conductor and by the first conductor, a second condenser and a second lamp connected in parallel by the tap conductor and by the second conductor, rectifiers in the first and second conductors respectively for controlling current flow, whereby the first condenser is charged during flow of the positive half cycles of current in the winding and the second condenser is charged during flow of the negative half cycles of current, a resistor in parallel circuit relation with each condenser lamp combination, a first trip circuit including an electronic valve having a control grid, means connecting the control grid thereof to the winding between the tap and first conductor, whereby the valve is fired during flow of positive half cycles of current to produce a voltage pulse, circuit means connecting said valve with the second lamp for delivering the voltage pulse to render the lamp conductive for discharging the second condenser, a second trip circuit also including an electronic valve having a control grid, means connecting the control grid thereof to the winding between the tap and second conductor, whereby the valve is fired during flow of negative half cycles of current to produce a voltage pulse, and other circuit means connecting said valve with the first lamp for delivering the voltage pulse to render the lamp conductive for discharging the first condenser.

7. In a flashing circuit for a plurality of gaseous conductor type lamps, in combination, a tap conductor, a first and a second conductor, a first and a second rectifier, a first condenser and a first lamp connected in parallel between the tap conductor and the first conductor and through the first rectifier, a second condenser and a second lamp connected in parallel between the tap conductor and the second conductor and through the second rectifier, a source of alternating current for charging the first condenser during the positive half cycles of current flow and for charging the second condenser during the negative half cycles of current flow, whereby the condensers are alternately charged, trip means for alternately discharging the condensers through their respective lamps to cause the lamps to flash, said trip means including a first electronic valve which is fired during positive half cycles of current flow for producing a voltage pulse, circuit means connecting said first electronic valve with the second lamp for delivering the voltage pulse and rendering the lamp conductive to discharge the second condenser, a second electronic valve which is fired during negative half cycles of current flow for producing a voltage pulse, and other circuit means connecting the second electronic valve with the first lamp for delivering the voltage pulse and rendering the lamp conductive to discharge the first condenser.

References Cited in the file of this patent

UNITED STATES PATENTS

| | | |
|---|---|---|
| 1,979,692 | Knowles | Nov. 6, 1934 |
| 2,310,092 | Knowles | Feb. 2, 1943 |
| 2,331,317 | Germeshausen | Oct. 12, 1943 |
| 2,478,901 | Edgerton | Aug. 16, 1949 |
| 2,478,908 | Edgerton | Aug. 16, 1949 |
| 2,622,229 | Lord | Dec. 16, 1952 |

FOREIGN PATENTS

| | | |
|---|---|---|
| 1,157,127 | France | Dec. 23, 1957 |